United States Patent
Nikhara et al.

(10) Patent No.: US 10,872,261 B2
(45) Date of Patent: Dec. 22, 2020

(54) DYNAMIC BINNING OF SENSOR PIXELS

(71) Applicant: QUALCOMM Incorporated, San Diego, CA (US)

(72) Inventors: Soman Ganesh Nikhara, Hyderabad (IN); Bapineedu Chowdary Gummadi, Hyderabad (IN); Edwin Chongwoo Park, San Diego, CA (US); Ravi Shankar Kadambala, Hyderabad (IN); Ankita Anil Kumar Choudha, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 16/208,416

(22) Filed: Dec. 3, 2018

(65) Prior Publication Data

US 2020/0175301 A1 Jun. 4, 2020

(51) Int. Cl.
*G06K 9/32* (2006.01)
*H04N 5/347* (2011.01)
*G06T 7/11* (2017.01)

(52) U.S. Cl.
CPC .............. *G06K 9/3233* (2013.01); *G06T 7/11* (2017.01); *H04N 5/347* (2013.01)

(58) Field of Classification Search
CPC ........ H04N 5/347; H04N 5/243; H04N 5/355; G06T 5/002; G06T 5/007; G06T 5/003; G06T 7/80
See application file for complete search history.

(56) References Cited

U.S. PATENT DOCUMENTS

| 7,030,738 | B2 * | 4/2006 | Ishii | B60R 1/00 340/425.5 |
| 2007/0075888 | A1 * | 4/2007 | Kelly | H03M 1/60 341/155 |
| 2012/0307098 | A1 * | 12/2012 | Hasegawa | H04N 5/347 348/222.1 |
| 2012/0314948 | A1 * | 12/2012 | Raveendran | H04N 19/59 382/173 |
| 2015/0049168 | A1 * | 2/2015 | Dielacher | H04N 7/18 348/46 |
| 2015/0189198 | A1 * | 7/2015 | Park | H04N 5/347 348/302 |
| 2016/0269611 | A1 * | 9/2016 | Kutsuma | H04N 5/243 |
| 2018/0137602 | A1 * | 5/2018 | Spitzer | G06T 3/4007 |
| 2018/0152632 | A1 * | 5/2018 | Tang | H04N 5/23212 |
| 2019/0124275 | A1 * | 4/2019 | Murad | H04N 5/347 |
| 2019/0335089 | A1 * | 10/2019 | Kadambala | H04N 5/232411 |

* cited by examiner

*Primary Examiner* — Dung Hong
(74) *Attorney, Agent, or Firm* — Weaver Austin Villeneuve & Sampson LLP

(57) ABSTRACT

Some dynamic pixel binning methods may involve identifying ROI optical sensor data corresponding to optical sensor pixels in a region of interest (ROI). Some such methods also may involve identifying non-ROI optical sensor data corresponding to optical sensor pixels outside the region of interest and determining a first binning factor for the non-ROI optical sensor data. The first binning factor may be based on a number of pixels in the region of interest and a target output data rate. Some such methods also may involve applying the first binning factor to the non-ROI optical sensor data and outputting optical sensor data, including the binned non-ROI optical sensor data, at the target output data rate.

27 Claims, 5 Drawing Sheets

DYNAMIC BINNING OF SENSOR PIXELS

TECHNICAL FIELD

This disclosure relates generally to optical sensing devices and methods.

DESCRIPTION OF THE RELATED TECHNOLOGY

The current approaches for reducing power and bandwidth for optical sensing devices generally involves pixel "binning," in which information from more than one adjacent optical sensor pixel is combined. Current pixel binning methods generally involve configuring sensor binning for a complete frame to provide a fixed date rate. Fixed binning helps to reduce power consumption but can reduce resolution. Reduced resolution can decrease the effectiveness of an optical sensing device, e.g., by reducing the accuracy and/or sensitivity of gesture and vision applications.

SUMMARY

The systems, methods and devices of the disclosure each have several innovative aspects, no single one of which is solely responsible for the desirable attributes disclosed herein.

One innovative aspect of the subject matter described in this disclosure can be implemented in an optical sensing device and/or an optical sensing system. The device or system may include an array of optical sensor pixels, an interface system that includes at least one interface and a first control system, at least part of which is configured for communication with the array of optical sensor pixels. Some optical sensing systems may include a second control system. Accordingly, in some such implementations the first control system and the second control system may be considered first and second portions of a single control system. The first and/or second control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some implementations, at least a portion of the control system may be, or may include, a register interface.

In some examples, the interface system may include a wireless interface system. In some implementations, the interface system may include a network interface, an interface between at least a portion of the first and/or second control system and the array of optical sensor pixels, an interface between at least a portion of the first and/or second control system and a memory system, an interface between the first control system and the second control system and/or an interface between at least a portion of the first and/or second control system and an external device interface (e.g., a port or an applications processor). In some examples, the interface system may include one or more user interfaces, such as a display, a touch screen, a microphone, etc.

The first control system may be configured for communication with the array of optical sensor pixels. The first control system may be configured for receiving optical sensor data from the array of optical sensor pixels, for identifying first region of interest (ROI) optical sensor data corresponding to optical sensor pixels in a first region of interest and for identifying non-ROI optical sensor data corresponding to optical sensor pixels outside the first region of interest. The first control system may be configured for determining a first binning factor for the non-ROI optical sensor data. Determining the first binning factor may be based, at least in part, on a number of pixels in the region of interest and a target output data rate. The first control system may be configured for applying the first binning factor to the non-ROI optical sensor data, to produce binned non-ROI optical sensor data and for outputting, via the interface system, optical sensor data, including the binned non-ROI optical sensor data, at the target output data rate.

According to some implementations, applying the first binning factor to the non-ROI optical sensor data may involve determining an average value of optical sensor data from two or more optical sensor pixels. In some instances, the target output data rate may correspond to a maximum number of optical sensor pixels in the region of interest.

According to some implementations, the first control system may be further configured for providing, via the interface system, the optical sensor data to a second control system that includes at least one processor. In some such implementations, identifying the first ROI optical sensor data may involve receiving first ROI information, via the interface system, from the second control system and determining the first binning factor may involve receiving first binning factor information from the second control system. In some examples, an optical sensing system may include the second control system and an optical sensing device that includes the first control system.

In some examples wherein the first control system includes at least one processor, identifying the first ROI optical sensor data may involve determining ROI information, by the first control system, based on the optical sensor data received from the array of optical sensor pixels, and determining the first binning factor may involve determining first binning factor information by the first control system based, at least in part, on the number of pixels in the region of interest and the target output data rate.

In some implementations, the first control system may be further configured for determining whether outputting first ROI optical sensor data and the binned non-ROI optical sensor data would exceed the target data rate. According to some such implementations, if the first control system determines that outputting first ROI optical sensor data and the binned non-ROI optical sensor data would exceed the target data rate, the first control system may be further configured for determining a second binning factor for the first ROI optical sensor data. Determining the second binning factor may be based, at least in part, on the binned non-ROI optical sensor data and the target output data rate. According to some such implementations, the first control system may be further configured for applying the second binning factor to the first ROI optical sensor data to produce binned first ROI optical sensor data and for outputting the binned first ROI optical sensor data and the binned non-ROI optical sensor data.

In some such implementations, the first control system may be further configured to apply a larger binning factor to the non-ROI optical sensor data prior to determining whether outputting non-binned ROI optical sensor data and the binned first non-ROI optical sensor data would exceed the target data rate. The larger binning factor may be larger than the first binning factor.

In some examples, the first control system may be further configured for identifying second ROI optical sensor data corresponding to optical sensor pixels in a second region of interest, for determining a first ROI binning factor for the first ROI optical sensor data, for determining a second ROI binning factor for the second ROI optical sensor data, for applying the first ROI binning factor to the first ROI optical sensor data and for applying the second ROI binning factor to the second ROI optical sensor data.

Other innovative aspects of the subject matter described in this disclosure can be implemented in an optical sensing method. The method may involve receiving, by a first control system, optical sensor data from an array of optical sensor pixels, identifying, by the first control system, ROI optical sensor data corresponding to optical sensor pixels in a region of interest, and identifying, by the first control system, non-ROI optical sensor data corresponding to optical sensor pixels outside the region of interest.

The method may involve determining, by the first control system, a first binning factor for the non-ROI optical sensor data. Determining the first binning factor may be based, at least in part, on a number of pixels in the region of interest and a target output data rate. The method may involve applying, by the first control system, the first binning factor to the non-ROI optical sensor data, to produce binned non-ROI optical sensor data and outputting, via an interface system, optical sensor data, including the binned non-ROI optical sensor data, at the target output data rate.

In some examples, the method may involve providing, via the interface system, the optical sensor data to a second control system comprising at least one processor. In some such examples, identifying the ROI optical sensor data may involve receiving ROI information, via the interface system, from the second control system and determining the first binning factor may involve receiving first binning factor information from the second control system.

In some examples wherein the first control system includes at least one processor, identifying the first ROI optical sensor data may involve determining ROI information, by the first control system, based on the optical sensor data received from the array of optical sensor pixels, and determining the first binning factor may involve determining first binning factor information by the first control system based, at least in part, on the number of pixels in the region of interest and the target output data rate.

In some instances, the method may involve determining whether outputting non-binned ROI optical sensor data and the binned non-ROI optical sensor data would exceed the target data rate. In some examples wherein it is determined that outputting non-binned ROI optical sensor data and the binned non-ROI optical sensor data would exceed the target data rate, the method may involve determining a second binning factor for the ROI optical sensor data. Determining the second binning factor may be based, at least in part, on the binned non-ROI optical sensor data and the target output data rate. In some such examples, the method may involve applying the second binning factor to the ROI optical sensor data to produce binned ROI optical sensor data and outputting the binned ROI optical sensor data and the binned non-ROI optical sensor data.

Some such methods may involve applying a maximum binning factor to the non-ROI optical sensor data prior to determining whether outputting non-binned ROI optical sensor data and the binned non-ROI optical sensor data would exceed the target data rate.

According to some implementations, the method may involve applying a fractional first binning factor to the non-ROI optical sensor data via an extrapolation method. In some examples, applying the first binning factor to the non-ROI optical sensor data may involve determining an average value of optical sensor data from two or more optical sensor pixels. In some instances, the target output data rate may correspond to a maximum number of optical sensor pixels in the region of interest.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform an optical sensing method. The method may involve receiving, by a first control system, optical sensor data from an array of optical sensor pixels, identifying, by the first control system, ROI optical sensor data corresponding to optical sensor pixels in a region of interest, and identifying, by the first control system, non-ROI optical sensor data corresponding to optical sensor pixels outside the region of interest.

The method may involve determining, by the first control system, a first binning factor for the non-ROI optical sensor data. Determining the first binning factor may be based, at least in part, on a number of pixels in the region of interest and a target output data rate. The method may involve applying, by the first control system, the first binning factor to the non-ROI optical sensor data, to produce binned non-ROI optical sensor data and outputting, via an interface system, optical sensor data, including the binned non-ROI optical sensor data, at the target output data rate.

In some examples, the method may involve providing, via the interface system, the optical sensor data to a second control system comprising at least one processor. In some such examples, identifying the ROI optical sensor data may involve receiving ROI information, via the interface system, from the second control system and determining the first binning factor may involve receiving first binning factor information from the second control system.

In some examples wherein the first control system includes at least one processor, identifying the first ROI optical sensor data may involve determining ROI information, by the first control system, based on the optical sensor data received from the array of optical sensor pixels, and determining the first binning factor may involve determining first binning factor information by the first control system based, at least in part, on the number of pixels in the region of interest and the target output data rate.

In some instances, the method may involve determining whether outputting non-binned ROI optical sensor data and the binned non-ROI optical sensor data would exceed the target data rate. In some examples wherein it is determined that outputting non-binned ROI optical sensor data and the binned non-ROI optical sensor data would exceed the target data rate, the method may involve determining a second binning factor for the ROI optical sensor data. Determining the second binning factor may be based, at least in part, on the binned non-ROI optical sensor data and the target output data rate. In some such examples, the method may involve applying the second binning factor to the ROI optical sensor data to produce binned ROI optical sensor data and outputting the binned ROI optical sensor data and the binned non-ROI optical sensor data.

Some such methods may involve applying a maximum binning factor to the non-ROI optical sensor data prior to determining whether outputting non-binned ROI optical sensor data and the binned non-ROI optical sensor data would exceed the target data rate.

According to some implementations, the method may involve applying a fractional first binning factor to the non-ROI optical sensor data via an extrapolation method. In some examples, applying the first binning factor to the non-ROI optical sensor data may involve determining an average value of optical sensor data from two or more optical sensor pixels. In some instances, the target output data rate may correspond to a maximum number of optical sensor pixels in the region of interest.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1A:
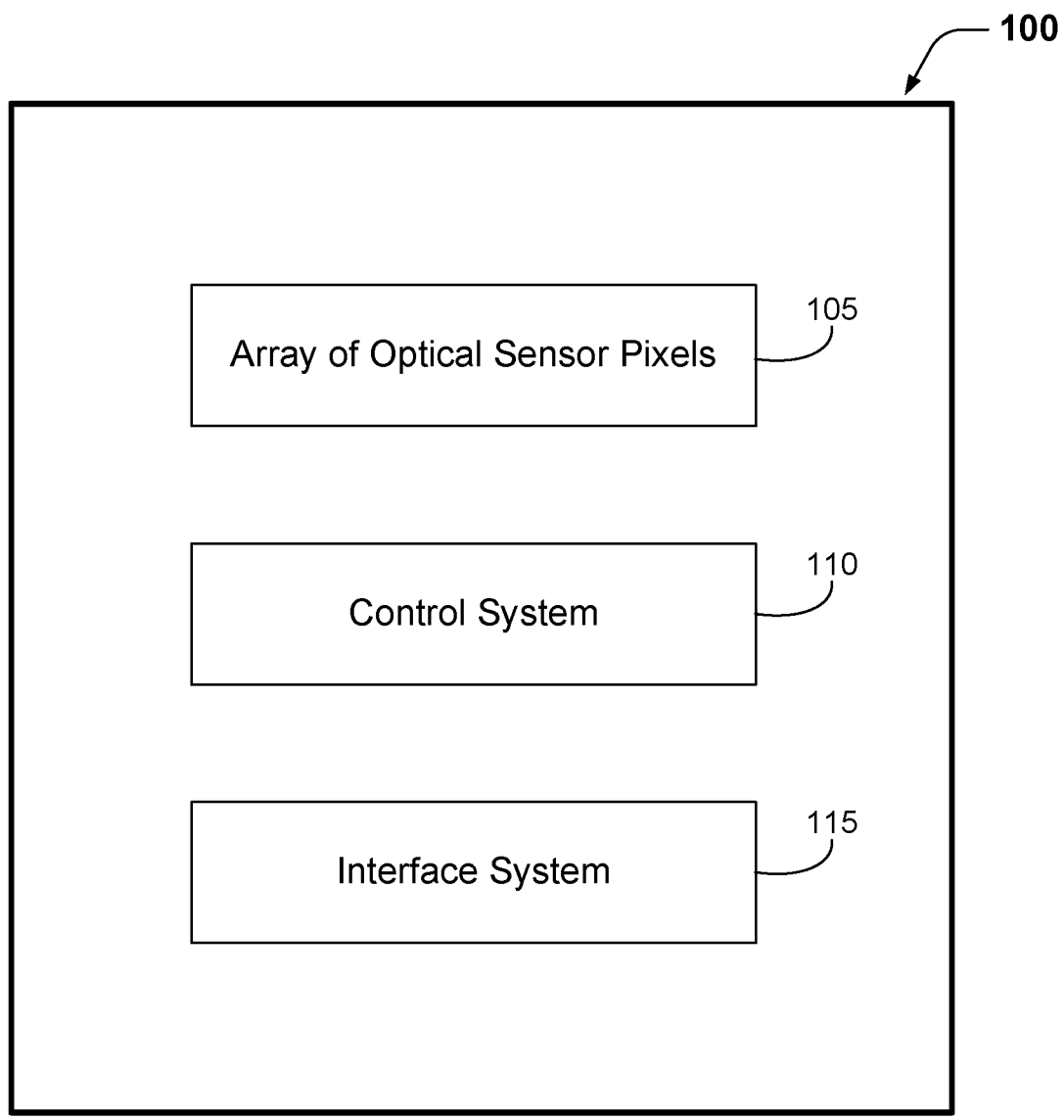
FIG. 1A is a block diagram that shows example components of an apparatus according to some implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes an apparatus or system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smart-books, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Some implementations may be implemented in one or more nodes of the Internet of Things (IoT). Thus, the teachings are not intended to be limited to the implementations depicted solely in the Figures, but instead have wide applicability as will be readily apparent to one having ordinary skill in the art.

Various implementations disclosed herein may include an optical sensing device or system that may be configured to for dynamic pixel binning. Some dynamic pixel binning methods may involve identifying ROI optical sensor data corresponding to optical sensor pixels in a region of interest (ROI). Some such methods also may involve identifying non-ROI optical sensor data corresponding to optical sensor pixels outside the region of interest and determining a first binning factor for the non-ROI optical sensor data. The first binning factor may be based on a number of pixels in the region of interest and a target output data rate. Some such methods also may involve applying the first binning factor to the non-ROI optical sensor data and outputting optical sensor data, including the binned non-ROI optical sensor data, at the target output data rate. In some implementations, the same binning factor may be achieved by using different combinations of width and height. For example, a binning factor of 8× could be accomplished by binning an area having 2 optical sensor pixels in width and 4 pixels in height, or by binning an area having 2 optical sensor pixels in height and 4 pixels in width.

Particular implementations of the subject matter described in this disclosure can be implemented to realize one or more of the following potential advantages. In some implementations, the output data rate may be maintained at the same level, or substantially the same level, for both static and dynamic scenes. Some such dynamic pixel binning methods may maintain a constant output data rate during the dynamic pixel binning process, even while the ROI changes. Some such dynamic pixel binning methods can provide relatively better pixel resolution than prior binning methods while maintaining a constant data rate.

It is often the case that an image's region(s) of interest include optical sensor pixels corresponding to objects (such as humans, animals, cars, etc.) in the image's foreground. Various methods may be used for distinguishing the non-ROI areas or "background" from the ROI. For example, background subtraction (also known as foreground detection) methods may be used for distinguishing the background of an image from one or more areas in which the image has changed. Background subtraction may be based on detected image changes between a current frame and a reference frame, which may be called a "background model." Image change detection may be used for detecting moving objects in a video stream, such as a video stream from a security camera, a video stream from a doorbell camera, a video stream from a baby monitor camera, a video stream from a camera associated with a voice-controlled device, etc. (As used herein, the term "camera" may be used to refer to any one of a range of devices having varying capabilities and complexities, including security cameras, simple optical sensors, etc.) For example, a current pixel, or a current group of pixels, may be considered to be part of the ROI if the difference between the current pixel (or the current group of pixels) and a corresponding portion of the background model is greater than or equal to a threshold value.

FIG. 1A is a block diagram that shows example components of an apparatus according to some implementations. In this example, the apparatus 100 includes an array of optical sensor pixels 105 and a control system 110 that is configured to communicate with the array of optical sensor pixels 105. The control system 110 may be configured to communicate with the array of optical sensor pixels 105 via wired communication and/or wireless communication. Accordingly, at least a portion of the control system 110 may be coupled to the array of optical sensor pixels 105. As used herein, the term "coupled to" has a meaning that could include being physically coupled for wired communication or being configured for wireless communication.

The control system 110 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. Although the interface system 115 is shown as being separate from the control system 110, in some implementations the interface system 115 may be part of the control system 110. In some implementations, the interface system 115 may include the entire control system 110. The control system 110 also may include (and/or be configured for communication with) one or more memory devices, such as one or more random access memory (RAM) devices, read-only memory (ROM) devices and/or other types of non-transitory media. In some implementations, at least a portion of the control system 110 may be implemented as a register. Accordingly, the apparatus 100 may have a memory system that includes one or more memory devices, though the memory system is not shown in FIG. 1A.

The control system 110 may be capable of performing, at least in part, the methods disclosed herein. In some examples, the control system 110 may be capable of performing at least some of the methods described herein according to instructions (e.g., software) stored on non-transitory media. For example, the control system 110 may be configured for controlling the array of optical sensor pixels 105 and/or for receiving and processing data from at least a portion of the array of optical sensor pixels 105, e.g., as described below.

Although shown as separate components in FIG. 1A, the array of optical sensor pixels 105 may, in some examples, include at least a portion of the control system 110. For example, the array of optical sensor pixels 105 may include one or more processors, microprocessors, programmable logic devices, discrete gates or transistor logic, etc. According to some implementations, the array of optical sensor pixels 105 may include a complementary metal-oxide-semiconductor (CMOS) sensor. In other examples, the array of optical sensor pixels 105 may include a charge-coupled device (CCD) sensor. The sensor and the control system 110 may or may not reside on the same die, depending on the particular implementation. In some examples, the apparatus 100 may include one or more lenses coupled to the array of optical sensor pixels 105. In some examples, the array of optical sensor pixels 105 may be, or may include, Qualcomm's Always on Computer Vision Sensor, one implementation of which has a 320 by 240 array of pixels and an 8-bit width, and consumes milliwatts of power, including the power used by the optical sensor and the power consumed by associated processing. By way of comparison, a camera module in a smartphone generally consumes hundreds of milliwatts of power, or in some cases watts of power.

In the example shown in FIG. 1A, the apparatus 100 includes an interface system 115. In some examples, the interface system may include a wireless interface system. In some implementations, the interface system 115 may include a network interface, an interface between the control system 110 and the array of optical sensor pixels 105, an interface between the control system 110 and a memory system and/or an interface between the control system 110 and an external device interface (e.g., a port or an applications processor). In some examples, the interface system 115 may include one or more user interfaces, such as a display, a touch screen, a microphone, etc.

According to some implementations, the apparatus 100 may be a single device, whereas in other implementations the apparatus 100 may be a system that includes more than one device. Accordingly, the terms "apparatus" and "system" may sometimes be used interchangeably herein. In other examples, the apparatus 100 may be a component of another device. For example, in some implementations at least a portion of the array of optical sensor pixels 105 and/or the control system 110 may be included in more than one apparatus. In some examples, a second device may include some or all of the control system 110, but may not include the array of optical sensor pixels 105. However, the control system 110 may nonetheless be configured to communicate with the array of optical sensor pixels 105. Some examples are described below.

Figure 1B:
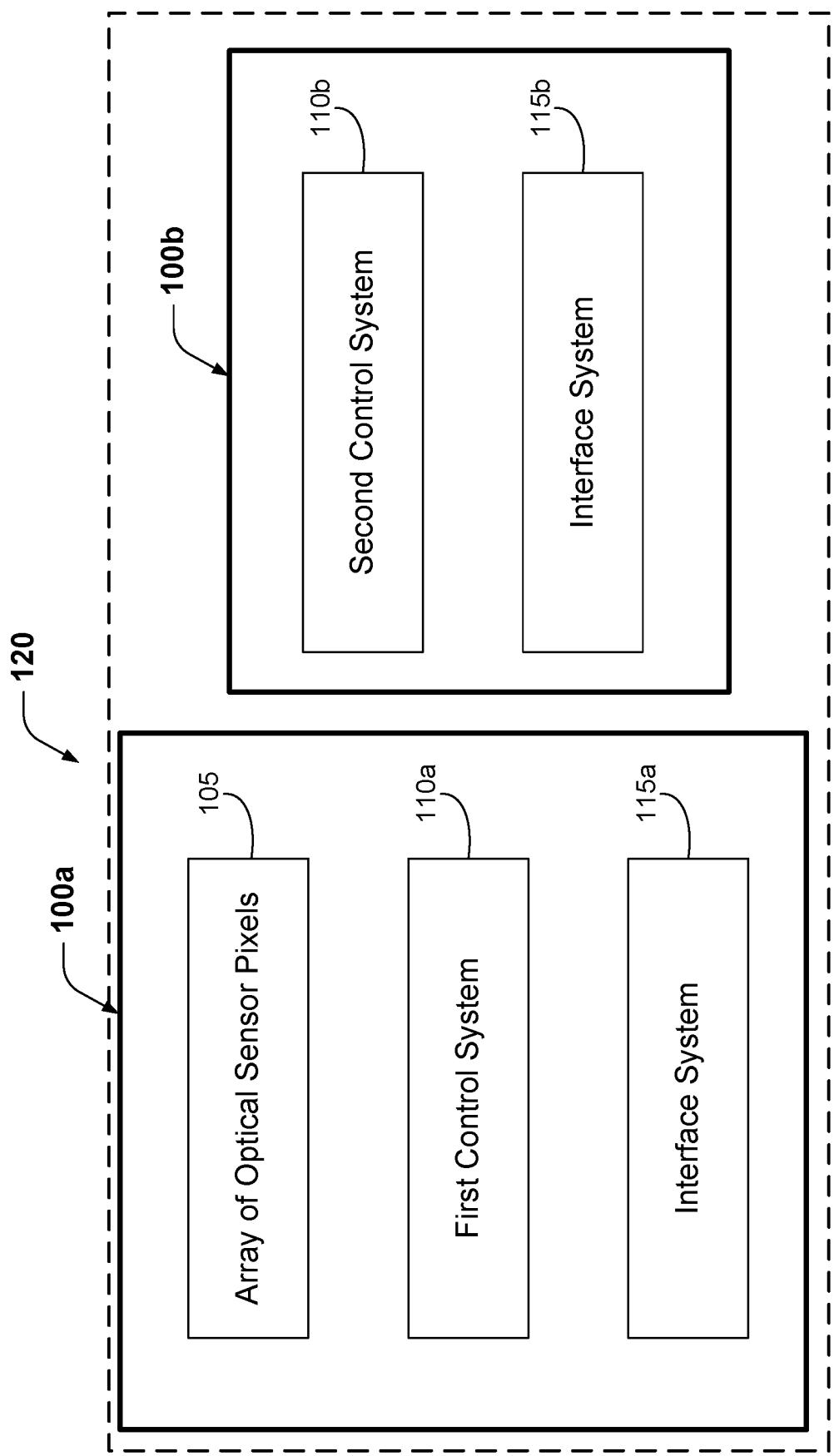
FIG. 1B is a block diagram that shows example components of a system according to some implementations.

FIG. 1B is a block diagram that shows example components of a system according to some implementations. In this example, the system 120 includes an apparatus 100a and an apparatus 100b. According to some examples, the system 120 may be, or may include, a security camera or a baby monitor camera. In other implementations, the system 120 may be, or may include, a voice-controlled device, a doorbell device, or another type of device.

The apparatus 100a includes an array of optical sensor pixels 105 and a first control system 110a that is configured to communicate with the array of optical sensor pixels 105. The first control system 110a may be configured to communicate with the array of optical sensor pixels 105 via wired communication and/or wireless communication. Accordingly, at least a portion of the first control system 110a is coupled to the array of optical sensor pixels 105 in this example. Here, the apparatus 100a also includes an interface system 115a that is configured for communication with the apparatus 100b. The interface system 115a may be configured for communication with the apparatus 100b via wired or wireless communication, depending on the particular implementation.

According to this example, the system 120 also includes an apparatus 100b, which does not include an array of optical sensor pixels. In this implementation, the apparatus 100b includes a second control system 110b and an interface system 115b that is configured for communication with the apparatus 100a via wired or wireless communication, depending on the particular implementation. The communication between the apparatus 100a and the apparatus 100b may, in some examples, be made via means that are not illustrated in FIG. 1B. In some examples, there may be another chip that is connecting the apparatus 100a and the apparatus 100b. In other implementations, there may be a logical interface between the apparatus 100a and the apparatus 100b. The logical interface may be implemented via additional physical components.

In this example, the first control system 110a and the second control system 110b are configured for communication via the interface systems 115a and 115b. According to some examples, the first control system 110a may be relatively less complex than the second control system 110b. For example, the second control system 110b may be, or may include, one or more general purpose single- or multi-chip processors, and the first control system 110a may include an FPGA or another type of programmable logic device, one or more discrete gates or transistor logic, a microprocessor, etc. In some disclosed implementations, a method may be performed in part by the first control system 110a and in part by the second control system 110b. Accordingly, in some such implementations the first control system 110a and the second control system 110b may be considered first and second portions of a single control system. However, in alternative implementations a method may be performed entirely by the control system 110 of FIG. 1A, by the first control system 110a of FIG. 1B or by the second control system 110b of FIG. 1B.

Figure 2:
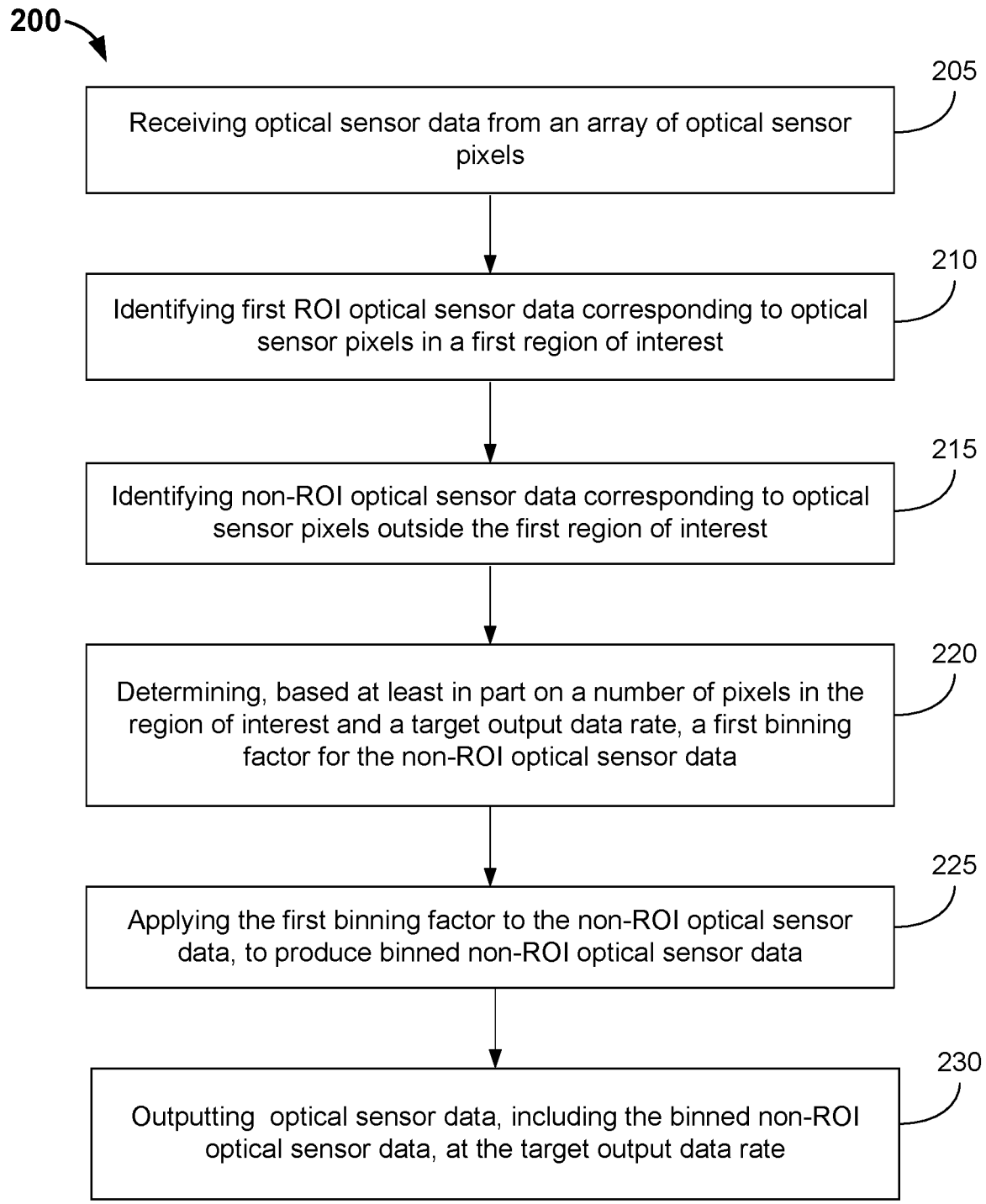
FIG. 2 is a flow diagram that provides examples of operations according to some disclosed methods.

FIG. 2 is a flow diagram that provides examples of operations according to some disclosed methods. The blocks of FIG. 2 (and those of other flow diagrams provided herein) may, for example, be performed by the apparatus 100 of FIG. 1A, by a similar apparatus, by one or more components of the system 120 of FIG. 1B or by a similar system. As with other methods disclosed herein, the method outlined in FIG. 2 may include more or fewer blocks than indicated. Moreover, the blocks of methods disclosed herein are not necessarily performed in the order indicated.

According to this example, method 200 is an optical sensing method. Here, block 205 involves receiving optical sensor data from an array of optical sensor pixels. In some examples, block 205 involves a control system (such as the control system 110 of FIG. 1A or the first control system 110a of FIG. 1B) receiving optical sensor data from the array of optical sensor pixels 105 disclosed herein.

In this implementation, block 210 involves identifying ROI optical sensor data corresponding to optical sensor pixels in a region of interest. In some examples, block 210 may involve applying (via the control system 110 of FIG. 1A, the first control system 110a of FIG. 1B or the second control system 110b of FIG. 1B) one or more background subtraction methods for distinguishing the background of an image from one or more areas in which the image has changed. For example, a control system may apply a background subtraction method based on detected image changes between a current frame and a reference frame. In some implementations, block 210 may involve more than one ROI. As noted below, some multiple-ROI implementations may include a first ROI on a first side (e.g., a left side) of an array of optical sensor pixels and a second ROI on a second side (e.g., a right side) of an array of optical sensor pixels.

According to this example, block 215 involves identifying non-ROI optical sensor data corresponding to optical sensor pixels outside the region of interest. In some examples, block 215 may simply involve determining which optical sensor pixels of an array of optical sensor pixels were not in the ROI determined in block 210. In alternative implementations, block 215 may involve identifying ROI optical sensor data corresponding to optical sensor pixels outside a first region of interest. Some such implementations may involve identifying second through $N^{th}$ ROI optical sensor data corresponding to optical sensor pixels in second through $N^{th}$ regions of interest that are outside of the first region of interest.

In this example, block 220 involves determining a first binning factor for the non-ROI optical sensor data. Here, determining the first binning factor is based, at least in part, on a number of pixels in the region of interest and a target output data rate. In some instances, the target output data rate may correspond to a maximum number of optical sensor pixels in the region of interest. A target output data rate may, for example, be determined according to a maximum ROI size. In some examples, a sensor may adjust the original ROI, e.g., to ensure the ROI meets a minimum or maximum width requirement, a minimum or maximum height requirement, etc. According to some examples, a sensor may adjust the original ROI as a function of a desired number of bits or a desired amount of power that will be used for the sensor or the sensor interface. Binning more aggressively will generally lead to lower interface energy consumption, because fewer bits will be transferred. Depending on the implementation, binning more aggressively will generally reduce power consumption. Some implementations may involve determining a binning factor for at least one ROI. Some multiple-ROI implementations may involve applying one binning factor to a first ROI and a different binning factor to a second ROI. Some such multiple-ROI implementations may involve applying different binning factors to each of N regions of interest. In some implementations, the same binning factor may be achieved by using different combinations of width and height. For example, a binning factor of 6× may be accomplished by binning an area having 2 optical sensor pixels in width and 3 pixels in height, or by binning an area having 2 optical sensor pixels in height and 3 pixels in width. According to some such implementations, different regions of the ROI or non-ROI optical sensor data will be binned using different width/height pixel combinations. In some such examples, the same binning factor may be achieved by using one combination of width and height in a first region and a second combination of width and height in a second region. For example, the same binning factor may be achieved by using a 2-pixel height and a 4-pixel width on the top and bottom of an ROI (or the top and bottom of a non-ROI area) and by using a 2-pixel width and a 4-pixel height on the left and right sides of an ROI (or the left and right sides of a non-ROI area).

In some examples, blocks 205-220 may be performed, at least in part, by more than one control system, or more than one portion of a single control system. For example, referring to the system 120 of FIG. 1B, the method 200 may involve the apparatus 100a providing (via the interface systems 115a and 115b), optical sensor data from the array of optical sensors 105 to the second control system 110b. The second control system 110b may, in some such instances, be more complex than the first control system 110a and may include at least one processor.

In some such examples, blocks 210-220 may be performed, at least in part, by the second control system 110b. The first control system 110a may, in some instances, be configured for identifying the ROI optical sensor data according to ROI information, received via the interface systems 115a and 115b, from the second control system 110b. The first control system 110a may be configured for determining the first binning factor according to first binning factor information received from the second control system.

In this implementation, block 225 involves applying the first binning factor to the non-ROI optical sensor data, to produce binned non-ROI optical sensor data. In some examples, block 225 may involve determining an average value of optical sensor data from two or more optical sensor pixels. In some implementations, block 225 may involve applying a fractional first binning factor (such as 1.33×) to the non-ROI optical sensor data via an extrapolation method. Some such extrapolation methods may include bilinear or bi-cubic extrapolation methods. In some instances, the extrapolation method(s) may be pre-set for a particular device, e.g., by a manufacturer or a vendor.

According to this example, block 230 involves outputting (e.g., via an interface system such as the interface system 115 of FIG. 1A, the interface system 115a of FIG. 1B or the interface system 115b of FIG. 1B), optical sensor data, including the binned non-ROI optical sensor data, at the target output data rate.

Figure 3A:
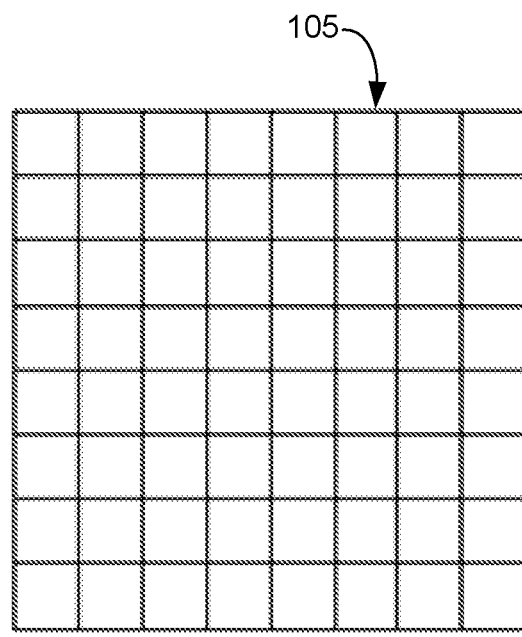
FIGS. 3A and 3B show examples of binning optical sensor pixels for a static scene and a dynamic scene, respectively.
Figure 3B:
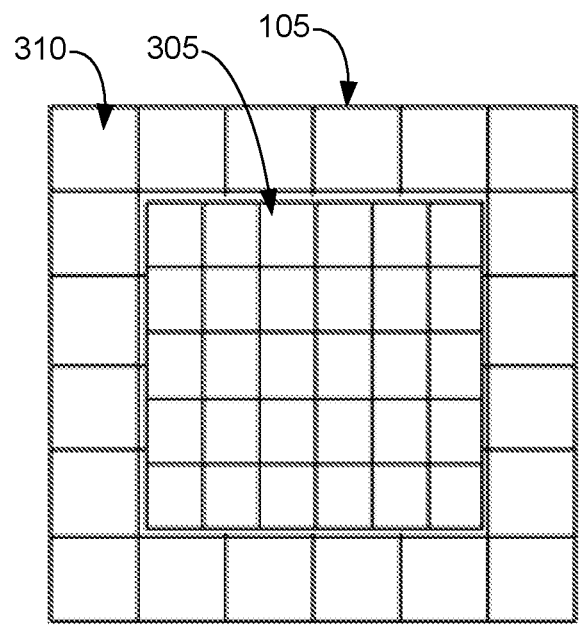

FIGS. 3A and 3B show examples of binning optical sensor pixels for a static scene and a dynamic scene, respectively. In the static scene example of FIG. 3A, no ROI has been detected. Therefore, in this example, a default binning method is applied. The default binning method may, for example, involve applying the same binning factor to all of the optical sensor pixels in the array of optical sensor pixels 105 to obtain a target output data rate, e.g., a desired output bit rate.

The target output data rate may correspond to a number of optical sensor pixels for which optical sensor data is output. In one example, suppose that an array of optical sensor pixels 105 includes 100 optical sensor pixels. According to one such example, the optical sensor data that is output will be always be the equivalent of 75 optical sensor pixels. When the scene is static, in one such example a 1.33× binning factor will be applied to the whole frame, so that the optical sensor data that is output will be 75 optical sensor pixels.

Referring now to FIG. 3B, in this example the ROI 305 and the non-ROI area 310 have been determined. In this example, the ROI 305 is a single, contiguous region of interest (ROI) that occupies 50% of the scene. According to this example, ROI optical sensor data corresponding to optical sensor pixels in the ROI will be output without having a binning factor applied. As noted elsewhere herein, having no binning factor applied may be considered as applying a 1× binning factor. In alternative examples, ROI optical sensor data will be output after a binning factor greater than 1 is applied. However, in this example a larger binning factor will be applied to non-ROI optical sensor data corresponding to optical sensor pixels in the non-ROI area 310, as compared to the binning factor that is applied to the ROI optical sensor data, to obtain a total amount of output optical sensor data that corresponds to 75 pixels. In some examples a 1.5× binning factor may be applied to the non-ROI optical sensor data and in other examples a 2× binning factor may be applied to the non-ROI optical sensor data. Other examples may involve applying a different binning factor to the non-ROI optical sensor data. In the above examples, the output is maintained at the target output data rate, but different binning factors are applied to optical sensor data from the ROI 305 and non-ROI/background area 310.

Other examples may include multiple ROIs, which may or may not be contiguous. Some multiple-ROI implementations may include a first ROI on a first side (e.g., a left side) of an array of optical sensor pixels and a second ROI on a second side (e.g., a right side) of an array of optical sensor pixels. Multiple-ROI implementations may or may not include symmetrical ROIs and/or ROIs of the same size, depending on the particular implementation. Some multiple-ROI implementations may involve applying one binning factor to a first ROI and a different binning factor to a second ROI. Some such multiple-ROI implementations may involve applying different binning factors to each of N regions of interest. However, in some such examples the same binning methods may be applied whether the ROIs are contiguous or non-contiguous. Moreover, in some examples one or more of the ROIs may not be rectangular in shape. According to some such examples, the ROIs may be configured as multiple concentric rings. For example, $ROI_1$ may be in a central area, $ROI_2$ may be in a first ring around the central area, $ROI_3$ may be in a second ring around the first ring, etc. In some implementations, the background binning rate may be changed based on the number of ROIs 305 and/or the percentage of sensor pixels that correspond to the ROI 305. If the percentage of pixels in the ROI 305 increases, the background binning rate may increase in order to maintain the target output data rate.

Accordingly, in various implementations a control system may ensure that target output data rate is maintained. However, in some examples the target output data rate may change. According to some implementations, if the target output data rate temporarily changes, a binning factor and/or ROI adjustment may be done. For example, if the data rate changes from a target data rate of 75 to a temporary data rate of 77, then the ROI area and/or a binning factor may be adjusted accordingly.

If the percentage of pixels in the ROI 305 increases beyond a threshold, some implementations may apply a binning factor greater than 1 to the optical sensor data from the ROI 305. According to some such implementations, the threshold may be determined according to whether outputting non-binned ROI optical sensor data (in other words, ROI optical sensor data to which a binning factor of 1 has been applied) and binned non-ROI optical sensor data would exceed the target data rate. In some examples, if an ROI size is greater than a maximum ROI allowed, the remaining binning will be adjusted in the ROI region. For example, if it is determined that an ROI size is greater than the maximum ROI allowed, binning may be applied for the ROI and a larger binning parameter may be used for pixels outside the ROI. In some examples, a maximum binning parameter may be used for pixels outside the ROI. Accordingly, the target output data rate may correspond to a maximum number of optical sensor pixels in the region of interest.

Figure 4:
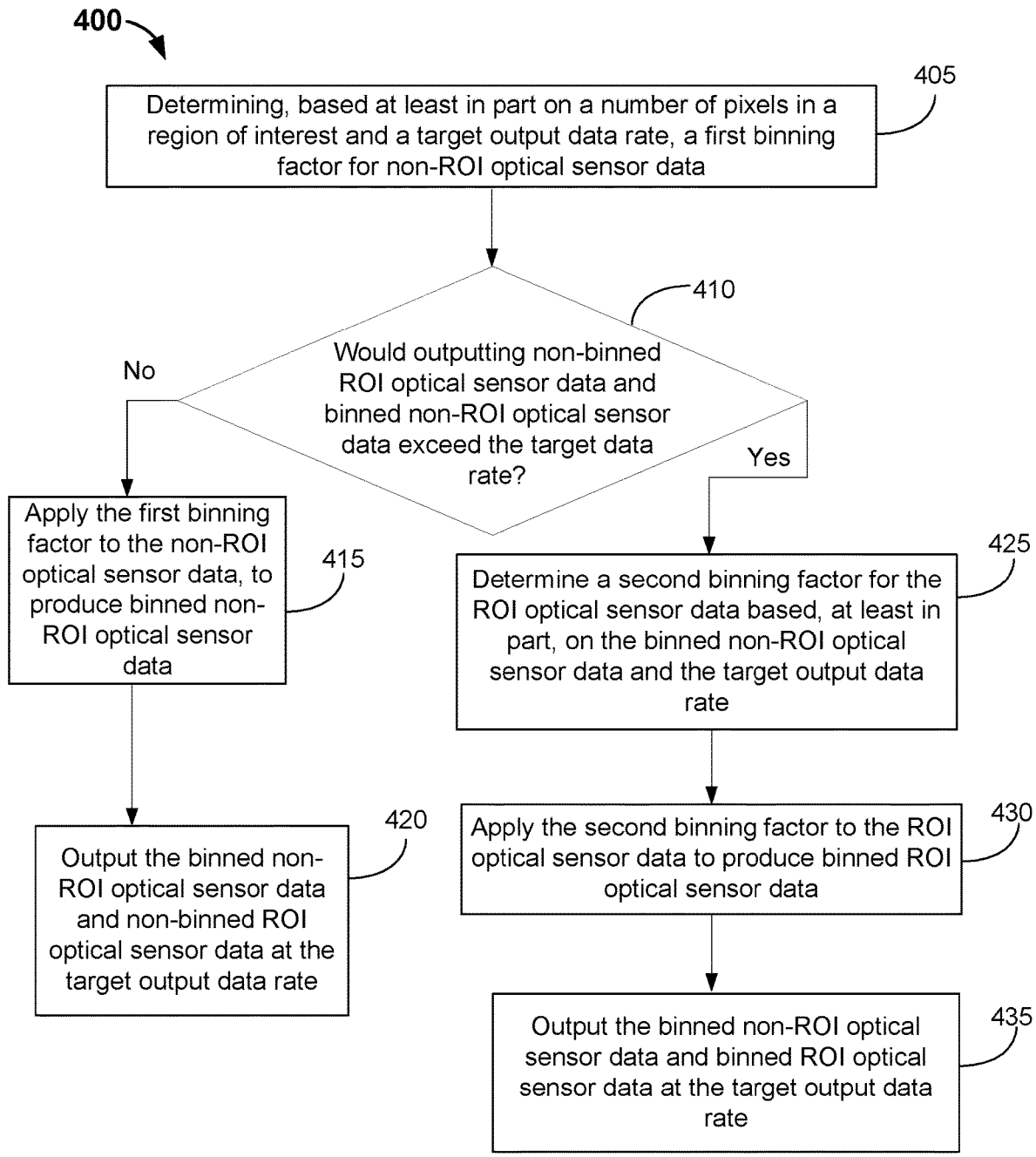
FIG. 4 is a flow diagram that provides examples of operations according to some alternative disclosed methods.

FIG. 4 is a flow diagram that provides examples of operations according to some alternative disclosed methods. The blocks of FIG. 4 (and those of other flow diagrams provided herein) may, for example, be performed by the apparatus 100 of FIG. 1A, by a similar apparatus, by one or more components of the system 120 of FIG. 1B or by a similar system. As with other methods disclosed herein, the method outlined in FIG. 4 may include more or fewer blocks than indicated. Moreover, the blocks of method 4 are not necessarily performed in the order indicated.

According to this example, method 400 is an optical sensing method. Here, block 405 involves determining, based at least in part on a number of pixels in a region of interest and a target output data rate, a first binning factor for non-ROI optical sensor data. In some implementations, block 405 may correspond to blocks 205-220 of FIG. 2. In this implementation, block 410 involves determining (e.g., by the control system 110 of FIG. 1A, by the first control system 110a of FIG. 1B or by the second control system 110b of FIG. 1B) whether outputting non-binned ROI optical sensor data and binned non-ROI optical sensor data would exceed the target data rate.

According to this example, if it is determined in block 410 that outputting non-binned ROI optical sensor data and binned non-ROI optical sensor data would not exceed the target data rate, the process continues to block 415, which involves applying the first binning factor to the non-ROI optical sensor data to produce binned non-ROI optical sensor data. The binned non-ROI optical sensor data and the non-binned ROI optical sensor data are output in block 420.

However, if it is determined in block 410 that outputting non-binned ROI optical sensor data and binned non-ROI optical sensor data would exceed the target data rate, the process continues to block 425 in this example. Although not expressly shown in FIG. 4, method 400 may involve setting the first binning factor to a maximum value before determining in block 410 that outputting non-binned ROI optical sensor data and binned non-ROI optical sensor data would exceed the target data rate and proceeding to block 425. For example, the maximum value for the first binning factor may be 2×, 4×, 6×, 8×, 10×, 12×, 14×, 16×, 18×, 20×, etc., depending on the particular implementation.

Here, block 425 involves determining a second binning factor for the ROI optical sensor data. In this example, determining the second binning factor is based, at least in part, on the binned non-ROI optical sensor data and the target output data rate. According to this example, block 430 involves applying the second binning factor to the ROI optical sensor data to produce binned ROI optical sensor data. In this implementation, block 435 involves outputting the binned non-ROI optical sensor data and binned ROI optical sensor data at the target output data rate.

In one such example, suppose that the binned non-ROI optical sensor data after applying the maximum value of the first binning factor corresponds to 10 pixels of optical sensor data. Suppose further that the target output data rate corresponds to 50 pixels of optical sensor data and that the ROI includes 60 optical sensor pixels. In this example, block 425 may involve determining that the second binning factor is 1.5×. Block 430 may involve applying the second binning factor to the ROI optical sensor data to produce 40 pixels of binned ROI optical sensor data. According to this example, block 435 may involve outputting the 40 pixels of binned ROI optical sensor data and the 10 pixels of non-ROI optical sensor data, making a total that equals the target output data rate of 50 pixels.

Dynamic binning may be very useful in a gesture/vision system sensor that is running on a battery-powered device. In one example, with dynamic binning of 1.77 (binning 16 MP to 9 MP in this example), the power savings was 22 mA or approximately 20%. Roughly speaking, with this device every percent increase in binning will save approximately 1 mA.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. An optical sensing device, comprising:
   an array of optical sensor pixels;
   an interface system comprising at least one interface; and
   a first control system configured for communication with the array of optical sensor pixels, the first control system being further configured for:
      receiving optical sensor data from the array of optical sensor pixels;
      identifying first ROI optical sensor data corresponding to optical sensor pixels in a first region of interest;
      identifying non-ROI optical sensor data corresponding to optical sensor pixels outside the first region of interest;
      determining a first binning factor for the non-ROI optical sensor data, wherein determining the first binning factor is based, at least in part, on a number of pixels in the region of interest and a target output data rate;
      applying the first binning factor to the non-ROI optical sensor data, to produce binned non-ROI optical sensor data;
      determining whether outputting the first ROI optical sensor data and the binned non-ROI optical sensor data would exceed the target output data rate; and
      outputting, via the interface system, optical sensor data, including the binned non-ROI optical sensor data, at the target output data rate.

2. The optical sensing device of claim 1, wherein the first control system is further configured for providing, via the interface system, the optical sensor data to a second control system comprising at least one processor, and wherein:
   identifying the first ROI optical sensor data comprises receiving first ROI information, via the interface system, from the second control system; and
   determining the first binning factor comprises receiving first binning factor information from the second control system.

3. An optical sensing system that includes the optical sensing device of claim 2 and the second control system.

4. The optical sensing device of claim 1, wherein the first control system comprises at least one processor and wherein:
   identifying the first ROI optical sensor data comprises determining ROI information, by the first control system, based on the optical sensor data received from the array of optical sensor pixels; and
   determining the first binning factor comprises determining first binning factor information by the first control system based, at least in part, on the number of pixels in the region of interest and the target output data rate.

5. The optical sensing device of claim 1, wherein the first control system determines that outputting first ROI optical sensor data and the binned non-ROI optical sensor data would exceed the target output data rate and wherein the first control system is further configured for:
   determining a second binning factor for the first ROI optical sensor data, wherein determining the second binning factor is based, at least in part, on the binned non-ROI optical sensor data and the target output data rate;
   applying the second binning factor to the first ROI optical sensor data to produce binned first ROI optical sensor data; and
   outputting the binned first ROI optical sensor data and the binned non-ROI optical sensor data.

6. The optical sensing device of claim 1, wherein the first control system is further configured to apply a larger binning factor to the non-ROI optical sensor data prior to determining whether outputting non-binned ROI optical sensor data and the binned first non-ROI optical sensor data would exceed the target output data rate, the larger binning factor being larger than the first binning factor.

7. The optical sensing device of claim 1, wherein the first control system is further configured for:
   identifying second ROI optical sensor data corresponding to optical sensor pixels in a second region of interest;
   determining a first ROI binning factor for the first ROI optical sensor data;
   determining a second ROI binning factor for the second ROI optical sensor data;
   applying the first ROI binning factor to the first ROI optical sensor data; and
   applying the second ROI binning factor to the second ROI optical sensor data.

8. The optical sensing device of claim 1, wherein applying the first binning factor to the non-ROI optical sensor data comprises determining an average value of optical sensor data from two or more optical sensor pixels.

9. The optical sensing device of claim 1, wherein the target output data rate corresponds to a maximum number of optical sensor pixels in the region of interest.

10. An optical sensing method, comprising:
receiving, by a first control system, optical sensor data from an array of optical sensor pixels;
identifying, by the first control system, ROI optical sensor data corresponding to optical sensor pixels in a region of interest;
identifying, by the first control system, non-ROI optical sensor data corresponding to optical sensor pixels outside the region of interest;
determining, by the first control system, a first binning factor for the non-ROI optical sensor data, wherein determining the first binning factor is based, at least in part, on a number of pixels in the region of interest and a target output data rate;
applying, by the first control system, the first binning factor to the non-ROI optical sensor data, to produce binned non-ROI optical sensor data;
determining whether outputting the first ROI optical sensor data and the binned non-ROI optical sensor data would exceed the target output data rate; and
outputting, via an interface system, optical sensor data, including the binned non-ROI optical sensor data, at the target output data rate.

11. The method of claim 10, further comprising providing, via the interface system, the optical sensor data to a second control system comprising at least one processor, wherein:
identifying the ROI optical sensor data comprises receiving ROI information, via the interface system, from the second control system; and
determining the first binning factor comprises receiving first binning factor information from the second control system.

12. The method of claim 10, wherein the first control system comprises at least one processor and wherein:
identifying the ROI optical sensor data comprises determining ROI information, by the first control system, based on the optical sensor data received from the array of optical sensor pixels; and
determining the first binning factor comprises determining first binning factor information by the first control system based, at least in part, on the number of pixels in the region of interest and the target output data rate.

13. The method of claim 10, wherein it is determined that outputting non-binned ROI optical sensor data and the binned non-ROI optical sensor data would exceed the target output data rate and wherein the method further comprises:
determining a second binning factor for the ROI optical sensor data, wherein determining the second binning factor is based, at least in part, on the binned non-ROI optical sensor data and the target output data rate;
applying the second binning factor to the ROI optical sensor data to produce binned ROI optical sensor data; and
outputting the binned ROI optical sensor data and the binned non-ROI optical sensor data.

14. The method of claim 10, further comprising applying a maximum binning factor to the non-ROI optical sensor data prior to determining whether outputting non-binned ROI optical sensor data and the binned non-ROI optical sensor data would exceed the target output data rate.

15. The method of claim 10, further comprising applying a fractional first binning factor to the non-ROI optical sensor data via an extrapolation method.

16. The method of claim 10, wherein applying the first binning factor to the non-ROI optical sensor data comprises determining an average value of optical sensor data from two or more optical sensor pixels.

17. The method of claim 10, wherein the target output data rate corresponds to a maximum number of optical sensor pixels in the region of interest.

18. One or more non-transitory media having software stored thereon, the software including instructions for controlling one or more devices to perform an optical sensing method, the method comprising:
receiving, by a first control system, optical sensor data from an array of optical sensor pixels; identifying, by the first control system, ROI optical sensor data corresponding to optical sensor pixels in a region of interest;
identifying, by the first control system, non-ROI optical sensor data corresponding to optical sensor pixels outside the region of interest;
determining, by the first control system, a first binning factor for the non-ROI optical sensor data, wherein determining the first binning factor is based, at least in part, on a number of pixels in the region of interest and a target output data rate;
applying, by the first control system, the first binning factor to the non-ROI optical sensor data, to produce binned non-ROI optical sensor data; and
determining whether outputting the first ROI optical sensor data and the binned non-ROI optical sensor data would exceed the target output data rate;
outputting, via an interface system, optical sensor data, including the binned non-ROI optical sensor data, at the target output data rate.

19. The one or more non-transitory media of claim 18, wherein the method further comprises providing, via the interface system, the optical sensor data to a second control system comprising at least one processor, wherein:
identifying the ROI optical sensor data comprises receiving ROI information, via the interface system, from the second control system; and
determining the first binning factor comprises receiving first binning factor information from the second control system.

20. The one or more non-transitory media of claim 18, wherein the first control system comprises at least one processor and wherein:
identifying the ROI optical sensor data comprises determining ROI information, by the first control system, based on the optical sensor data received from the array of optical sensor pixels; and
determining the first binning factor comprises determining first binning factor information by the first control system based, at least in part, on the number of pixels in the region of interest and the target output data rate.

21. The one or more non-transitory media of claim 18, wherein it is determined that outputting non-binned ROI optical sensor data and the binned non-ROI optical sensor data would exceed the target output data rate and wherein the method further comprises:
determining a second binning factor for the ROI optical sensor data, wherein determining the second binning factor is based, at least in part, on the binned non-ROI optical sensor data and the target output data rate;

applying the second binning factor to the ROI optical sensor data to produce binned ROI optical sensor data; and outputting the binned ROI optical sensor data and the binned non-ROI optical sensor data.

22. The one or more non-transitory media of claim 18, wherein the method further comprises applying a maximum binning factor to the non-ROI optical sensor data prior to determining whether outputting non-binned ROI optical sensor data and the binned non-ROI optical sensor data would exceed the target output data rate.

23. The one or more non-transitory media of claim 18, wherein the method further comprises applying a fractional first binning factor to the non-ROI optical sensor data via an extrapolation method.

24. The one or more non-transitory media of claim 18, wherein applying the first binning factor to the non-ROI optical sensor data comprises determining an average value of optical sensor data from two or more optical sensor pixels.

25. The one or more non-transitory media of claim 18, wherein the target output data rate corresponds to a maximum number of optical sensor pixels in the region of interest.

26. An optical sensing device, comprising:
   an array of optical sensor pixels;
   an interface system comprising at least one interface; and
   a first control means for communication with the array of optical sensor pixels, the first control means including means for:
      receiving optical sensor data from the array of optical sensor pixels;
      identifying ROI optical sensor data corresponding to optical sensor pixels in a region of interest;
      identifying non-ROI optical sensor data corresponding to optical sensor pixels outside the region of interest;
      determining a first binning factor for the non-ROI optical sensor data, wherein determining the first binning factor is based, at least in part, on a number of pixels in the region of interest and a target output data rate;
      applying the first binning factor to the non-ROI optical sensor data, to produce binned non-ROI optical sensor data;
      determining whether outputting the first ROI optical sensor data and the binned non-ROI optical sensor data would exceed the target output data rate; and
      outputting, via the interface system, optical sensor data, including the binned non-ROI optical sensor data, at the target output data rate.

27. An optical sensing system that includes the optical sensing device of claim 26 and also comprises second control means, wherein the first control means includes means for providing, via the interface system, the optical sensor data to the second control means and wherein:
   identifying the ROI optical sensor data comprises receiving ROI information, via the interface system, from the second control means; and
   determining the first binning factor comprises receiving first binning factor information from the second control means.

* * * * *